United States Patent
Shaw et al.

(10) Patent No.: US 7,933,205 B1
(45) Date of Patent: Apr. 26, 2011

(54) GENERALIZED INTERCONNECTION APPARATUS FOR DELIVERING SERVICES BASED ON REAL TIME PERFORMANCE REQUIREMENTS

(75) Inventors: Venson Shaw, Kirkland, WA (US); Q. James Hu, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 358 days.

(21) Appl. No.: 11/479,754

(22) Filed: Jun. 29, 2006

Related U.S. Application Data

(60) Provisional application No. 60/796,379, filed on May 1, 2006.

(51) Int. Cl.
H04L 12/26 (2006.01)
H04L 12/56 (2006.01)
(52) U.S. Cl. ............ 370/235; 370/389; 370/395.42
(58) Field of Classification Search ........... 370/230, 370/230.1, 232, 233, 235, 252, 389, 391, 370/395.4, 395.42, 395.43
See application file for complete search history.

(56) References Cited

U.S. PATENT DOCUMENTS

| | | | |
|---|---|---|---|
| 5,130,983 A | 7/1992 | Heffner, III | |
| 5,293,619 A | 3/1994 | Dean | |
| 5,329,578 A | 7/1994 | Brennan et al. | |
| 5,517,662 A | 5/1996 | Coleman et al. | |
| 5,742,762 A | 4/1998 | Scholl et al. | |
| 5,742,905 A | 4/1998 | Pepe et al. | |
| 5,887,170 A * | 3/1999 | Ansberry et al. ............ 709/204 |
| 6,052,382 A | 4/2000 | Burke et al. | |
| 6,052,526 A | 4/2000 | Chatt | |
| 6,055,568 A | 4/2000 | Adams | |
| 6,167,261 A | 12/2000 | Amin | |
| 6,212,163 B1 * | 4/2001 | Aida ............................ 370/230 |
| 6,292,465 B1 | 9/2001 | Vaid et al. | |
| 6,310,889 B1 | 10/2001 | Parsons et al. | |
| 6,360,262 B1 | 3/2002 | Guenthner et al. | |
| 6,363,421 B2 | 3/2002 | Barker et al. | |
| 6,381,599 B1 | 4/2002 | Jones et al. | |
| 6,427,171 B1 | 7/2002 | Craft et al. | |
| 6,430,602 B1 | 8/2002 | Kay et al. | |
| 6,550,024 B1 | 4/2003 | Pagurek et al. | |
| 6,553,404 B2 | 4/2003 | Stern | |
| 6,681,386 B1 | 1/2004 | Amin et al. | |
| 6,765,909 B1 * | 7/2004 | Sen et al. ...................... 370/392 |

(Continued)

FOREIGN PATENT DOCUMENTS

EP 1119213 * 7/2001

(Continued)

OTHER PUBLICATIONS

International Search Report and Written Opinion dated Apr. 3, 2008 for PCT Application Serial No. PCT/US07/67963, 24 Pages.

(Continued)

*Primary Examiner* — Pankaj Kumar
*Assistant Examiner* — Saba Tsegaye

(57) ABSTRACT

A system for interconnecting network operators with each other based on class of service is provided, taking real-time performance requirement(s) for each service into consideration. As a result, services can be sent or received in real time, with greater guarantee of network resources. In one non-limiting embodiment, the delivery path for service traffic is based on the real-time performance requirement categories assigned to each service during a pre-processing step. Thus, services having the highest real-time performance demands can be delivered faster using greater network resources, whereas the services without any real-time performance requirements are processed/delivered using fewer network resources.

33 Claims, 10 Drawing Sheets

U.S. PATENT DOCUMENTS

| | | | |
|---|---|---|---|
| 6,775,267 B1 | 8/2004 | Kung et al. | |
| 6,789,108 B1 | 9/2004 | McMillan | |
| 6,822,940 B1 | 11/2004 | Zavalkovsky et al. | |
| 6,832,241 B2 | 12/2004 | Tracton et al. | |
| 6,856,598 B1 * | 2/2005 | Stanfield | 370/235 |
| 6,857,020 B1 | 2/2005 | Chaar et al. | |
| 6,891,802 B1 | 5/2005 | Hubbard | |
| 6,917,610 B1 | 7/2005 | Kung et al. | |
| 6,928,471 B2 | 8/2005 | Pabari et al. | |
| 6,959,006 B1 * | 10/2005 | Sarnikowski et al. | 370/468 |
| 6,981,029 B1 * | 12/2005 | Menditto et al. | 709/217 |
| 7,027,800 B2 | 4/2006 | Haumont et al. | |
| 7,167,866 B2 * | 1/2007 | Farnham et al. | 707/100 |
| 7,477,657 B1 * | 1/2009 | Murphy et al. | 370/468 |
| 7,522,581 B2 * | 4/2009 | Acharya et al. | 370/352 |
| 7,636,324 B2 * | 12/2009 | Nassar | 370/254 |
| 2001/0053694 A1 | 12/2001 | Igarashi et al. | |
| 2002/0087674 A1 | 7/2002 | Guilford et al. | |
| 2002/0147828 A1 * | 10/2002 | Chen et al. | 709/231 |
| 2002/0151312 A1 | 10/2002 | Bos et al. | |
| 2003/0053473 A1 | 3/2003 | Kung et al. | |
| 2003/0108052 A1 | 6/2003 | Inoue et al. | |
| 2003/0115203 A1 * | 6/2003 | Brown et al. | 707/10 |
| 2003/0135339 A1 | 7/2003 | Gristina et al. | |
| 2003/0169751 A1 * | 9/2003 | Pulkka et al. | 370/401 |
| 2003/0177477 A1 | 9/2003 | Fuchs | |
| 2004/0117794 A1 | 6/2004 | Kundu | |
| 2004/0162892 A1 | 8/2004 | Hsu | |
| 2004/0177107 A1 * | 9/2004 | Qing et al. | 709/200 |
| 2004/0230675 A1 * | 11/2004 | Freimuth et al. | 709/223 |
| 2005/0086306 A1 | 4/2005 | Lemke | |
| 2005/0204076 A1 * | 9/2005 | Cumpson et al. | 710/36 |
| 2005/0228892 A1 | 10/2005 | Riley et al. | |
| 2006/0030311 A1 | 2/2006 | Cruz et al. | |
| 2006/0052113 A1 | 3/2006 | Ophir et al. | |
| 2006/0073810 A1 * | 4/2006 | Pyhalammi et al. | 455/407 |
| 2006/0129771 A1 | 6/2006 | Dasgupta et al. | |
| 2007/0064607 A1 * | 3/2007 | Moon et al. | 370/230 |
| 2007/0071031 A1 * | 3/2007 | Shin et al. | 370/468 |
| 2007/0118881 A1 * | 5/2007 | Mitchell et al. | 726/4 |
| 2007/0133449 A1 | 6/2007 | Schacht et al. | |

FOREIGN PATENT DOCUMENTS

| | | |
|---|---|---|
| WO | 2007/131000 A2 | 11/2007 |

OTHER PUBLICATIONS

OA Dated Dec. 17, 2008 U.S. Appl. No. 11/479,788, 21 pages.
OA Dated May 27, 2009 for U.S. Appl. No. 11/479,788, 15 pages.
OA mailed Oct. 17, 2008 for U.S. Appl. No. 11/483,068, 18 pages.
OA mailed Apr. 29, 2009 for U.S. Appl. No. 11/483,068, 23 pages.
OA dated Jul. 24, 2009 for U.S. Appl. No. 11/480,787, 41 pages.
OA dated Aug. 18, 2009 for U.S. Appl. No. 11/483,068, 38 pages.
OA mailed Oct. 27, 2009 for U.S. Appl. No. 11/479,788, 21 pages.
OA dated Dec. 4, 2009 for U.S. Appl. No. 11/480,787, 54 pages.
OA dated Feb. 5, 2010 for U.S. Appl. No. 11/483,068, 39 pages.
Office Action mailed Mar. 30, 2010 for U.S. Appl. No. 11/480,787, 67 pages.
OA dated Apr. 29, 2010 for U.S. Appl. No. 11/479,788, 25 pages.
CA OA dated Apr. 6, 2010 for Canadian Patent Application No. 2,648,015, 3 pages.
OA dated Aug. 31, 2010 for U.S. Appl. No. 11/480,787, 55 pages.

* cited by examiner

GENERALIZED INTERCONNECTION APPARATUS FOR DELIVERING SERVICES BASED ON REAL TIME PERFORMANCE REQUIREMENTS

CROSS REFERENCE TO RELATED APPLICATIONS

This application claims priority to U.S. provisional application 60/796,379, filed May 1, 2006 and to U.S. provisional application 60/796,471, filed May 1, 2006.

FIELD OF THE INVENTION

The present invention is directed to a generalized interconnection apparatus and methods for service delivery based on real-time, or non real-time, performance requirement(s).

BACKGROUND OF THE INVENTION

Today, when disparate networks by different network operators are interconnected, the network operators interconnect with one another using terms set by "best efforts" contractual clauses, "industry practices or norms" and other notions of "fair trade."

FIG. 1 depicts the current model for interconnection, which uses best efforts to achieve provision of services across interconnected networks. As shown in FIG. 1, when operator A wishes to pass traffic through to operator B, or vice versa, or when operator B wishes for operator A to pass traffic through to operator B, there are performance demands associated with interconnection of the networks of operator A and B, as represented by interconnection IN. Operator A, for instance, may expect operator B to perform the request for service immediately according to a real-time requirement, however, it is unclear what happens if operator B "tries its best," but fails to provide performance of the request for service in real-time. Thus, today, real-time performance requirements by interconnections for passing traffic from one network to another are set by "best efforts" made by each of the operators. However, there is no resolution mechanism for ensuring that the destination network operator will plan, schedule, and perform according to real-time requirements as demanded, and no way for the destination network operator to prepare its resources based on the real-time requirements of incoming service requests. In other words, today's model does not take real-time performance requirements into consideration when handling service requests across operator's networks. As a result, there is no guarantee whether a service handled by another network can be sent or received in real time.

With the proliferation of multimedia services, e.g., mobile television (mTV), video telephony, multimedia conference, etc., and the advancement of the terminal, hardware, and software technology, e.g., camera phone, Blue-tooth, Wi-Fi, Universal Mobile Telephone System (UMTS), etc., it is envisioned that there will be a wide range of new applications and services available which will demand real-time performance requirements for sending or delivering the service. These applications and services with real-time performance requirements present a significant revenue opportunity because real-time services are of high value to customers. Real-time services provide immediate results, which can be important for a class of multimedia applications and a host of other services and transactions requiring immediate action (e.g., a stock purchase electronic transaction where the purchase price is sensitive to time). However, as described above, current classification of services is not closely tied, or directly correlated, to the real-time requirements of a particular service, but rather operators merely make their best efforts to perform with the available resources. Plus, market forces give each of the operators an economic incentive to maximize their own revenue, which can create conflict with performing according to real-time demands where performing in real-time reaps less revenue for some reason than not performing in real-time for some requests. Thus, due to indefiniteness of best efforts clauses, it is difficult to ascertain what today's processes map to when ensuring the performance of services having real-time performance requirements in real-time.

Accordingly, it would be advantageous to classify services based on real-time performance requirement categories. It would be further desirable to dynamically allocate network resources based on requests for services received and their corresponding real-time performance categories and to intelligently route such services among disparate networks based on their real-time requirement categories so that from an overall standpoint, network services are provided in a manner that is consistent with the underlying real-time performance characteristics of the services offered via the network.

Solutions to these and other deficiencies of the state of the art of delivering services in telecommunications networks are thus desirable.

SUMMARY OF THE INVENTION

In consideration of such needs in the art, the invention provides a system for interconnecting network operators with each other based on class of service, taking real-time performance requirement(s) for each service into consideration. As a result, services can be sent or received in real time, with greater guarantee of network resources. In one non-limiting embodiment, the delivery path for service traffic is based on the real-time performance requirement categories assigned to each service during a pre-processing step. Thus, services having the highest real-time performance demands can be delivered faster using greater network resources, whereas the services without any real-time performance requirements are processed/delivered using fewer network resources.

Other features of the invention are described in more detail below.

BRIEF DESCRIPTION OF THE DRAWINGS

The interconnection apparatus for service delivery based on real-time performance requirements in accordance with the invention is further described with reference to the accompanying drawings in which.

DETAILED DESCRIPTION OF ILLUSTRATIVE EMBODIMENTS

As described in the background section, with the proliferation of multimedia services and the advancement of the terminal, hardware, and software technology, it is envisioned that there will be a wide range of new applications and services which will require real-time performance. Such applications and services are believed to provide a significant revenue generating opportunity for mobile operators. However, current classification of services is not closely tied to real-time performance characteristics of a particular service. Rather, they are vaguely guaranteed based on "best efforts." Accordingly, the invention provides systems and methods for classifying and routing services based on real-time or non real-time performance requirements applicable to the underlying services.

Figure 1:
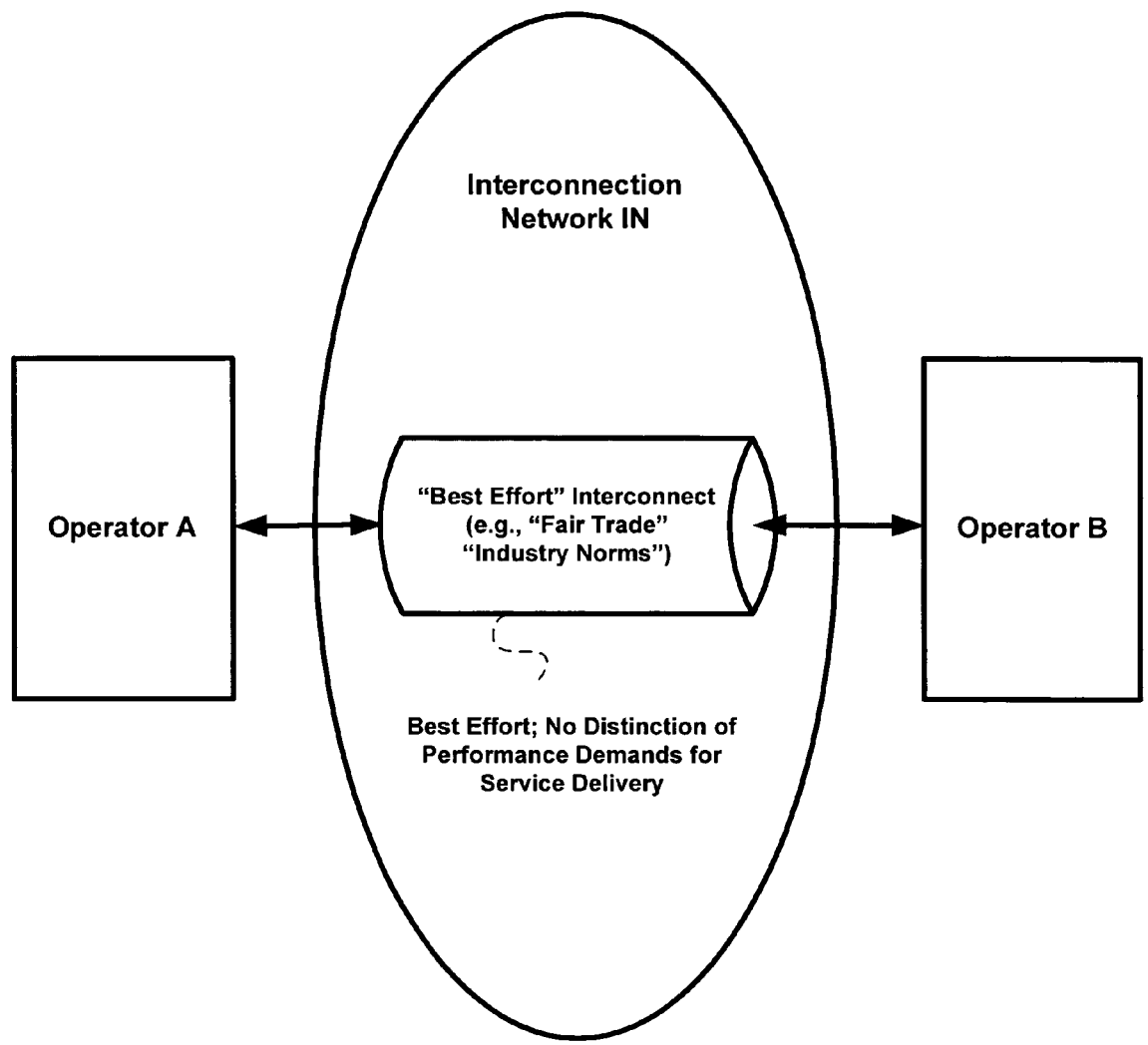
FIG. 1 depicts the current model for interconnection, which uses best efforts to achieve provision of real-time services across interconnected networks.
Figure 2:
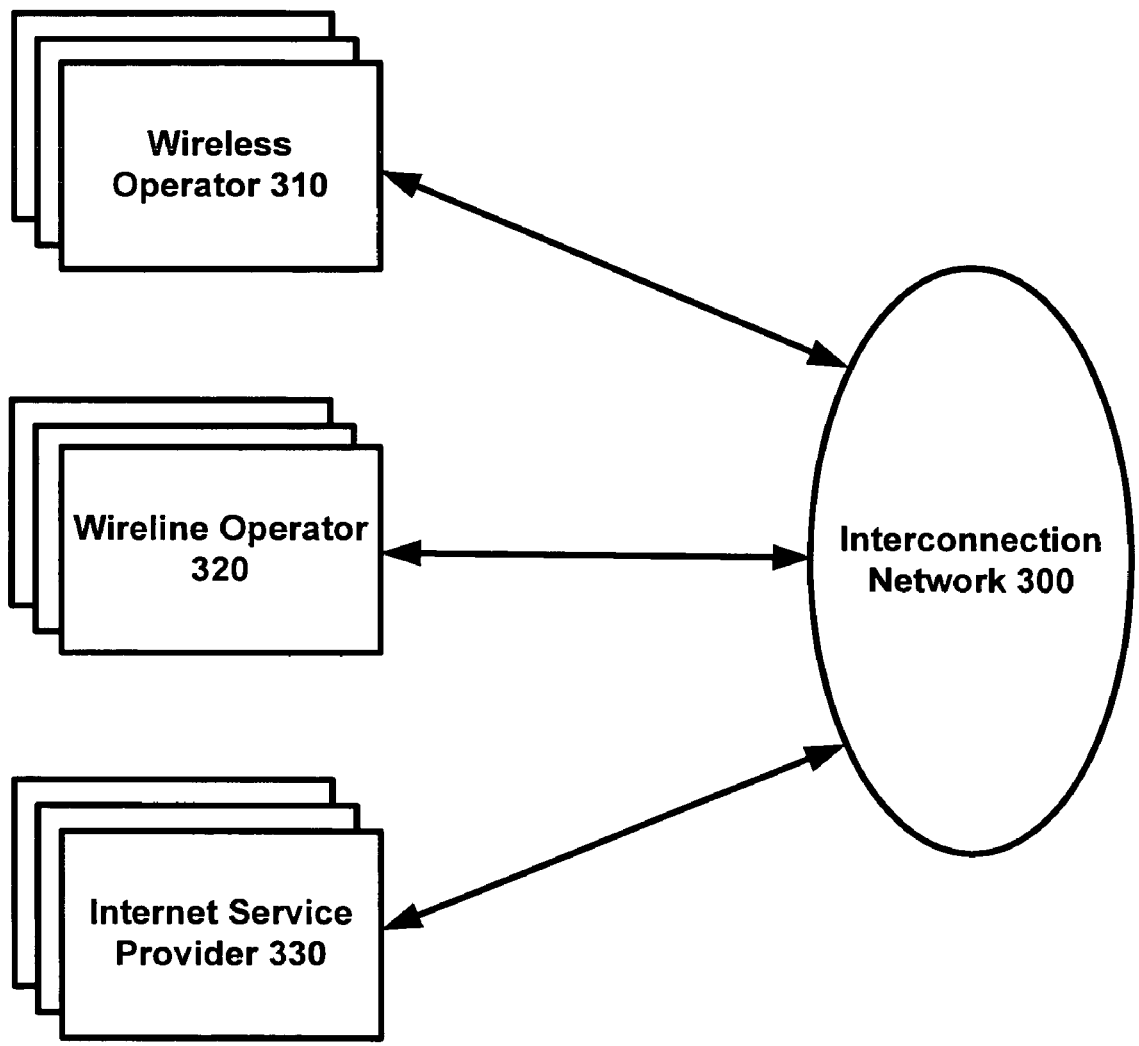
FIG. 2 depicts an interconnection scenario that is optimized in accordance with the invention so that various network operators and Internet service providers can connect with each other to deliver service traffic in a manner that corresponds to the real-time performance requirements of the traffic involved.

FIG. 2 depicts an opportunity to which the invention applies for global operators (wireline and wireless) and Internet service providers to connect with each other to deliver (send and receive) in a way that maps to the real-time requirements of the service traffic implicated. As shown in FIG. 2, the invention provides systems and methods for an interconnection network 300 that enables the provision of services across disparate networks according to real-time performance requirements or levels of the services. For instance, as shown, a plurality of wireless wide area network operators 310 may interconnect with one another, or in turn, with a plurality of wireline operators 320, or in turn, with a plurality of Internet service providers 330, and such interconnections can be made in accordance with the invention and internetwork traffic can be scheduled and processed based on real-time performance requirements of the service traffic.

It is worth noting at the outset that not all real-time services have the same "real-time" requirements, i.e., some are more real-time demanding than others. The same can be said for non real-time requirements, i.e., that some have fewer requirements than other non real-time services. Plus, each operator may treat real-time performances differently for a specific service. The same is true across geographical markets for the same service. For instance, a service might be really important, in terms of immediate provision of the service, in Europe (and require real-time performance as a result) but not so important in Japan (where an alternative technology may be available to render the real-time network performance of the service moot). Therefore, flexibility in the ability to utilize different real time performance requirements for a given operator is an important feature of the present invention.

Accordingly, one embodiment enables the separation of services into two or more categories of performance, such as "real-time performance required" and "real-time performance not required." Such embodiments may further enable hierarchical categorization of top level performance categories, such as real-time performance required services and real-time performance not required services, by further dividing the top level performance categories into subcategories. For instance, "real-time performance required" services can be divided into "Extremely Demanding," "Moderately Demanding" and "Less Demanding" categories. Likewise, for "real-time performance not required" services, the services can be further categorized into "interactive" and "non-interactive" classes.

Moreover, policy management functions of network operators can be taken into consideration. For instance, the Policy Definition Function (PDF) of a network operator can partition the classes of services into a plurality of real-time performance classes of service. Then at the Policy Enforcement Point (PEP) for interconnection, the services associate with a class of service table of the PDF, which thus classifies the service, i.e., identifies a corresponding class of service based on real-time performance requirements for the service delivery.

More network resources may be assigned for sending and/or receiving multimedia service traffic with real-time performance requirements, while fewer network resources may be assigned for sending and/or receiving multimedia service traffic without real-time performance requirements.

In an exemplary embodiment, each service flow is partitioned into a sequence, or stream, of Internet Protocol (IP) packets, wherein each IP packet includes or is otherwise associable with a service identification (ID). For any interconnection of service traffic, there is an originating point for the service traffic and a destination point for the service traffic.

In a further embodiment, at both the originating point and the destination point, the following occurs: (a) an individual buffer pair is set up, i.e., a buffer at the originating point that corresponds to a buffer at the destination point, wherein each buffer pair corresponds with a specific class of service, which is based on real-time performance requirements; (b) a preprocessor allows the identification of a suitable class of service for delivery for each IP packet; and (c) each of the IP packets is then guided into a specific buffer for sending and receiving the service according to the class of real-time service requirement.

Figure 3A:
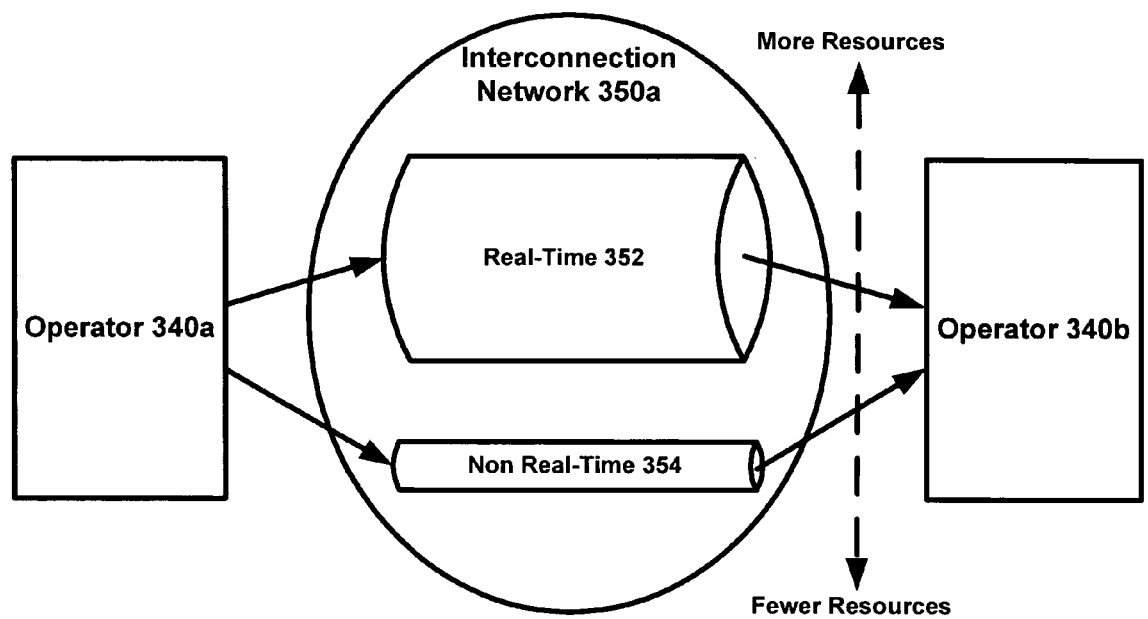
FIG. 3A illustrates an exemplary non-limiting block diagram that shows real-time and non real-time classes that may be assigned to service traffic passed between two networks in accordance with the invention.

FIG. 3A depicts a high level block diagram of an arrangement which separates the delivery path for service traffic among multiple networks based on whether the service has real-time requirements or not. As shown, an operator 340a is offloading a service to operator 340b for performance by operator 340b (e.g., backhauling of roaming traffic from a visited network to the home network) via interconnection network 350a. Based on whether the IP packets associated with the request for service are categorized as real-time service requests 352 or non real-time service requests 354, more or fewer resources are given to the request for service by the network of operator 340b, respectively, as shown by the dotted arrow. Where a request for service simultaneously implicates multiple services, each of the services can be handled individually according to real-time demands, or the set of services implicated by the request for services can be aggregated and assigned based on whether any given service within a set includes real-time demands. Thus, real-time services can be delivered faster using a fatter interconnection pipe (i.e., more abundant network resources), whereas non real-time services are delivered using a narrower interconnection pipe (i.e., fewer network resources).

Figure 3B:
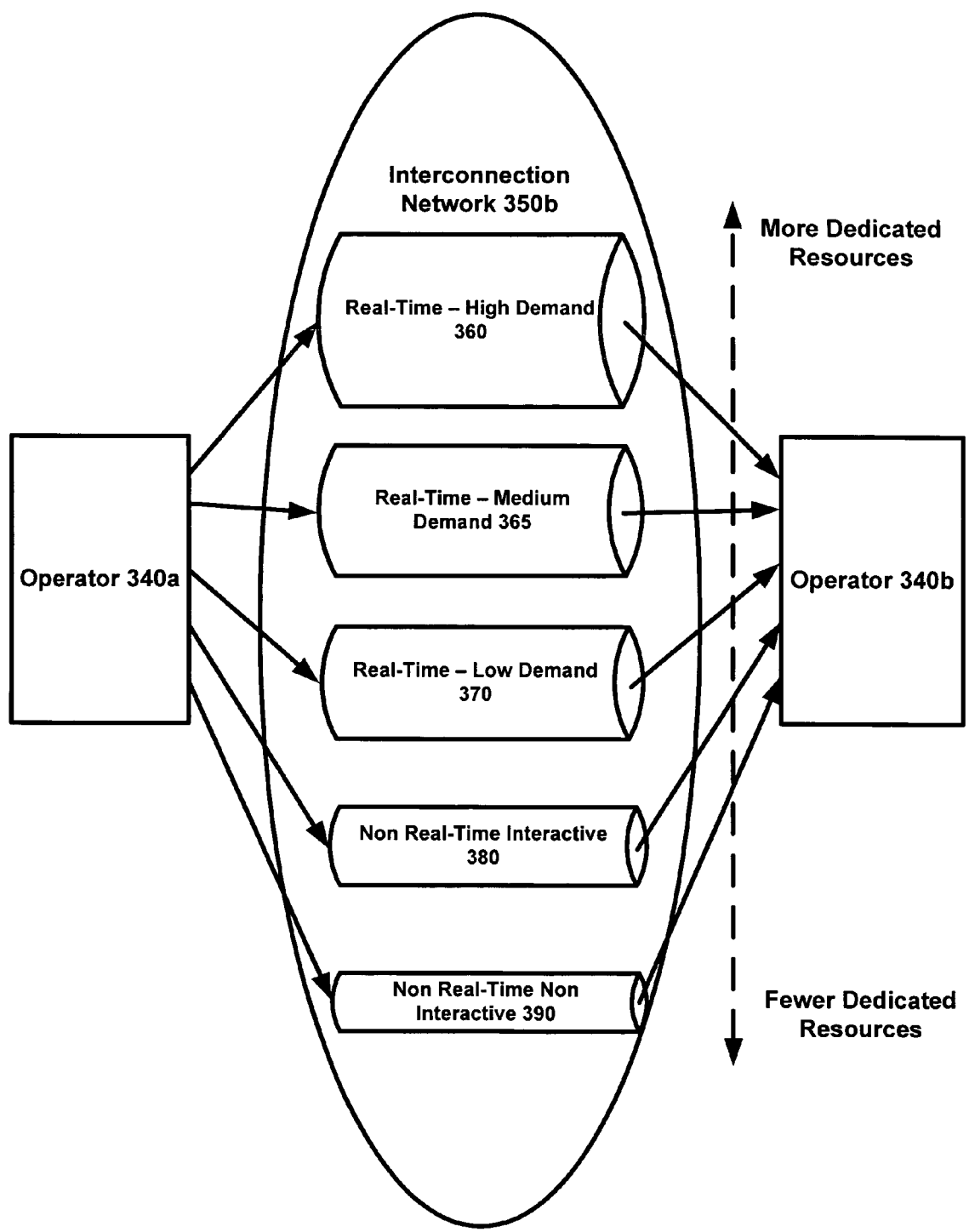
FIG. 3B illustrates an additional exemplary non-limiting block diagram that shows hierarchical classifications and sub-classifications, defined according to multiple criteria pertaining to real-time service requirements, that may be assigned to service traffic passed between two networks in accordance with the invention.

FIG. 3B depicts a high level block diagram of an alternative embodiment of an interconnection network 350b which separates the delivery path for service traffic among multiple networks based on the real time requirements of the service traffic at a first level, and further separates real-time and non-real time traffic into further subcategories. Based on whether the IP packets associated with the request for service are categorized as real-time high priority 360, real-time medium priority 365, real-time low priority 370, non real-time interactive 380, or non real-time non-interactive 390, more or less resources are given to the request for service by the network of operator 340b, respectively. Thus, for rich multi-media applications, premium real-time services can be delivered faster and non real-time and non-interactive services can be provided using the fewest network resources, with any number of levels between as well.

Accordingly, systems and methods are provided for separating services into at least two categories, including services that have real-time requirements and services that don't have real-time requirements. Furthermore, high revenue impact services can be sub-categorized into "High Priority", "Medium Priority" and "Low Priority" categories (or further subdivision as makes sense for a given superset of real-time services). Likewise, non real-time services can be further categorized into "Interactive" or "Non-Interactive" classes (or further subdivision as makes sense for a given superset of non real-time services). Naturally, according to further hierarchical principles, subdivisions may be further subdivided, and so on.

Figure 4:
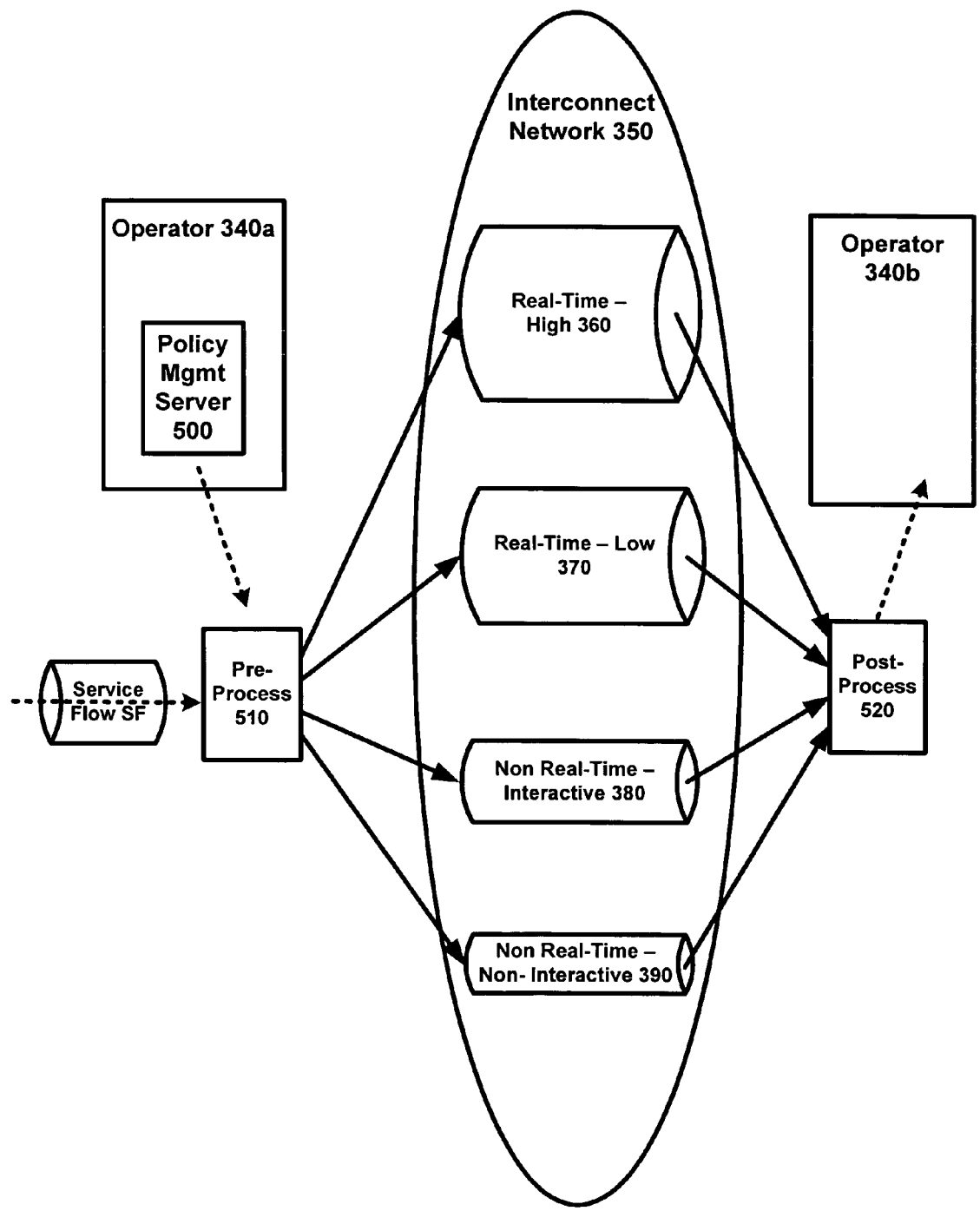
FIG. 4 depicts an exemplary process for categorizing a service according to a class of service by a policy management server in accordance with the invention.

FIG. 4 depicts an exemplary process for categorizing a service according to a class of service by a policy management server 400. The policy management server 500 applies network policies to services as they are passed through to a network, such as the services of service flow SF, including, but not limited to instant messaging (IM), multimedia messaging service (MMS), short messaging service (SMS), VideoShare, push to talk over cellular (PoC), and the like. The process performed by policy management Server 500 when classifying may be consistent with the real-time performance requirements of the service flow SF traffic. Embodiments of the invention may operate to pre-process with pre-processor 510 the traffic of service flow SF according to real-time service requirements that can be passed through to another network via interconnect network 350. As shown, service traffic is labeled, or classified as very real-time high priority 360, real-time low priority 370, non real-time interactive 380, or non real-time non-interactive 390. Then, according to the different queues of traffic that are transmitted to operator 340b for processing by the network of operator 340b, a post-processor can ready and prioritize scheduling for delivery of service requests to operator 340b in order to ensure that the real-time traffic with the highest priorities is handled in an optimum manner from the standpoint of available network resources. In this manner, the post-processor 520 can optimize the use of the network resources made available by operator 340b according to real-time servicing requirements of applications and services across computing networks.

Figure 5:
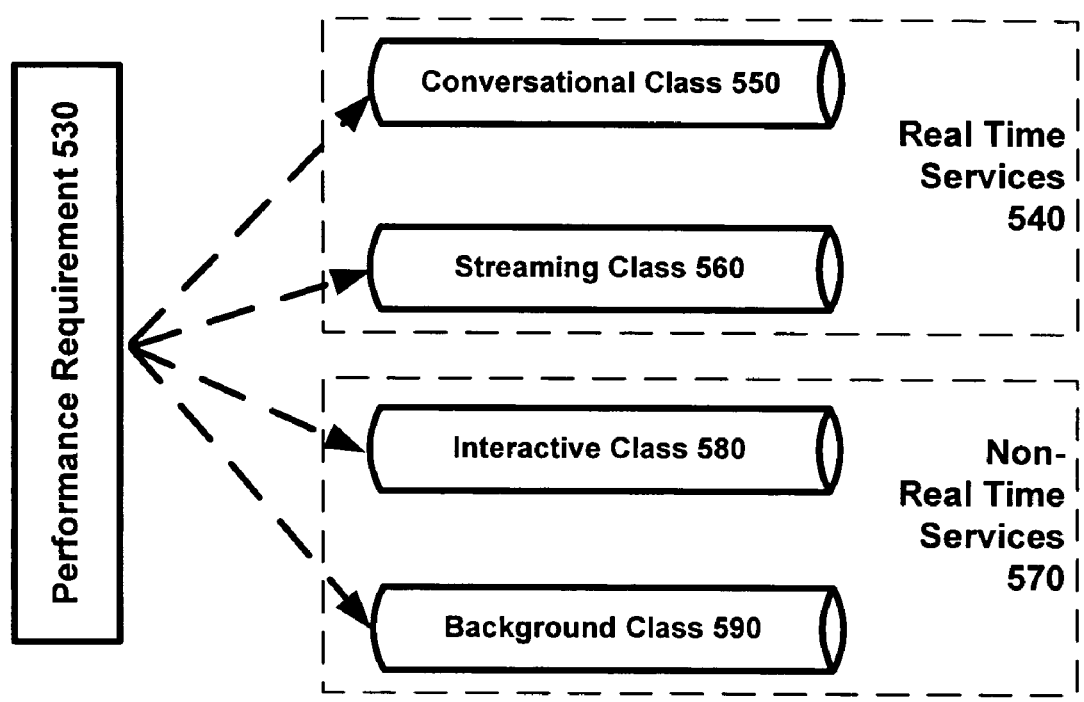
FIG. 5 illustrates an exemplary, non-limiting set of classifications and policy based criteria that a network operator may select for a policy management framework in accordance with the invention.

FIG. 5 is a block diagram illustrating an exemplary, non-limiting classification of services that an operator may implement, though for the avoidance of doubt, it should be appreciated that such classification is merely outlined as one possible classification scheme that may be selected by an operator, and that a near infinite number of classifications are possible depending on the policies and interests of a network operator. As shown in FIG. 5, an operator may configure a service mapping or classification process for services available on the network to be based on performance requirements 530. For instance, a performance requirement may include a quality of service (QoS) requirement that must be met in order to provide the service (i.e., a certain number of resources must be made available). Based on such considerations, the service can be further classified into one or more categories of service. For instance, the 3GPP IR-41 QoS buckets include conversational class 550, streaming class 560, which may be considered classes of services that have "real-time" requirements 540 and interactive class 580 and background class 590 may be considered classes of services that do not have real-time requirements 570. Table I below illustrates an exemplary, non-limiting breakdown of the above-described classifications.

TABLE I

Exemplary Classifications of Services

| QoS Type | | Exemplary Services Supported, e.g., |
|---|---|---|
| Traffic Class | Priority | Service ID |
| Conversational | N/A | Voice Over IP (VOIP) |
| | | Video Calls |
| | | Video Conferencing |
| | | Voice Services |
| | | Voice Conferencing |
| | | Telemetry - Two Way Control, High Priority |
| | | Interactive Games |
| Streaming | N/A | Audio Streaming, Speech, Mixed Music and Speech, Medium and High Quality Music |
| | | Video Streaming: Movie Clips, Surveillance, Real-Time Video |
| | | Video Sharing |
| | | Bulk Data Transfer/Retrieval |
| | | Synchronization Information |
| | | Telemetry One Way Control, Low Priority |
| | | Still Image |
| Interactive | 1 | Transactional Services - High Priority, e.g., E-Commerce, Automated Teller Machines (ATMs) |
| | | Location Services |
| | 2 | Web Browsing |
| | 3 | Instant Messaging (IM) |
| | | Voice Messaging |
| | | Video Messaging |
| | | E-mail (Server Access) |
| Background | N/A | E-mail (Server-to-Server) |
| | | Short Message Service (SMS)/Multimedia Message Service (MMS) |
| | | File Download, e.g. File Transfer Protocol (FTP) Session |

Figure 6:
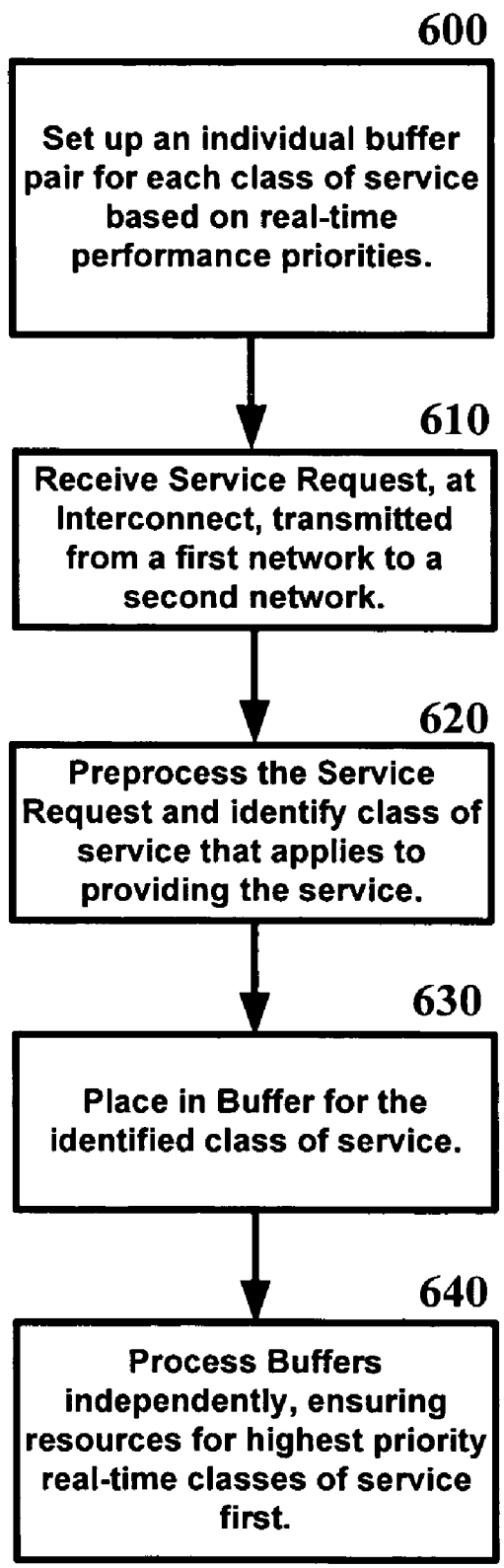
FIG. 6 is an exemplary, non-limiting flow diagram of a process for assigning requests for services transmitted across networks to categories based on real-time performance priorities in accordance with the invention.

FIG. 6 is an exemplary, non-limiting flow diagram of a process for assigning requests for services transmitted across networks to categories based on real-time performance priorities. At 600, initially, for each network operator, an individual buffer pair is created for each class of service based on real-time performance priorities. At 610, the interconnect component receives a request for service transmitted from a first network to a second network for handling by the second network. At 620, the interconnect component preprocesses the service request and identifies the class of service corresponding to the real-time performance requirements that apply to providing the service, and thus, at 630, is placed in the buffer that corresponds to the identified class of service.

At 640, the buffers for each class of service are processed independently, ensuring resources are allocated for the most demanding real-time or highest priority real-time classes of service first, or any other optimal arrangement for processing class of service buffers based on independent real-time performance requirements.

The classification of a service, i.e., the output of the classification process, can also be used as an input to network resource allocation mechanisms of the network to which the request for service is passed so as to ensure that the process for assigning appropriate network resources automatically provisions resources in proportion with the real-time performance levels represented by the classification of the service.

Accordingly, as described above, network operators may interconnect with each other using a class of service for each service, taking into account real-time performance levels for the service (real-time or not, interactive or not, QoS or not, high demand, medium demand, low demand, etc.). As a result, it is guaranteed that the most premium services can be sent or received in real time and that operators are compensated for delivering such dedicated services.

Without the guarantee of service delivery in meeting real-time performance requirements, the end user experience for service delivery becomes random, in-consistent and unsatisfactory, creating customer dissatisfaction, inhibiting services growth. Existing measures for operators to figure out how to guarantee real-time performance of services, i.e., "best efforts," is too vague, which inhibits reaching an optimally efficient economic stability as between two network operators interacting across their networks, passing traffic back and forth.

In contrast, with the guarantee of service delivery in meeting real-time performance requirements, the end user experience for the service delivery become consistent and satisfactory, leading to growth in services and overall customer satisfaction. In addition, network resource impact of surges of real-time requirements can be accommodated by embodiments of the invention.

With regard to payment for services, the systems and methods provided herein may be used in connection with standard charging and billing mechanisms, such as those defined by 3GPP, GSMA, and the like. Such technologies will undoubtedly continue to evolve and embodiments of the invention may incorporate such future technology. Finally, the system of the invention can support Interactive Multimedia Service (IMS) and 3G Universal Mobile Telephone System (UMTS) Commercialization standards, and like standards, and thus any of the variety of now existing or future services can be accommodated within the architecture of the invention.

In a further embodiment, the various aspects of the invention described above may be used in conjunction with systems and methods for prioritizing service based on revenue-impact. For example, revenue impact can be determined by the operators according to service related parameters such as subscriber information and cost of delivery. For example, revenue impact can be determined by the charging rate per unit of data as determined by the rate per data type (e.g., real time or SMS) and the subscription price. High revenue impact requests can accordingly be assigned higher network resources in order to encourage and support such premium traffic. Similarly, service requests of unknown origin can be penalized by assigning a higher charging rate while assigning low network resources.

The delivery path for service traffic among multiple networks can be separated based on the revenue impact and service priority level of each service. Based on whether the IP packets associated with the request for service are categorized as very high priority/revenue, high priority/revenue, medium priority/revenue or low priority/revenue, more or less resources can be given to the request for service by a particular operator's network. Where a request for service simultaneously implicates multiple services, each of the services can be handled individually according to priority level, or the set of services implicated by the request for services can be aggregated and assigned a single priority/revenue level, e.g., the highest priority/revenue level of any given service with the set. Thus, high revenue impact and high priority services can be delivered faster using a fatter interconnection pipe (i.e., more abundant network resources), whereas low revenue impact and low priority services are delivered using a narrower interconnection pipe (i.e., fewer network resources). It is noted that high priority does not always translate, or correspond, to high revenue (e.g., emergency communications which are mandated by the government are high priority, but low revenue), and accordingly, embodiments of the invention that incorporate a revenue impact component can provide the ability to independently route traffic based on the revenue impact and priority in addition to real time performance considerations.

Exemplary Non-Limiting Network and Operating Environments

The above-described architecture for service delivery based on real-time performance requirement(s) may be applied to interconnection of any networks, however, the following description sets forth some exemplary telephony radio networks and non-limiting operating environments. The below-described operating environments should be considered non-exhaustive, however, and thus the below-described network architecture merely shows an exemplary network architecture in which embodiments of invention may be incorporated. One can appreciate, however, that the invention may be incorporated into now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

Figure 7A:
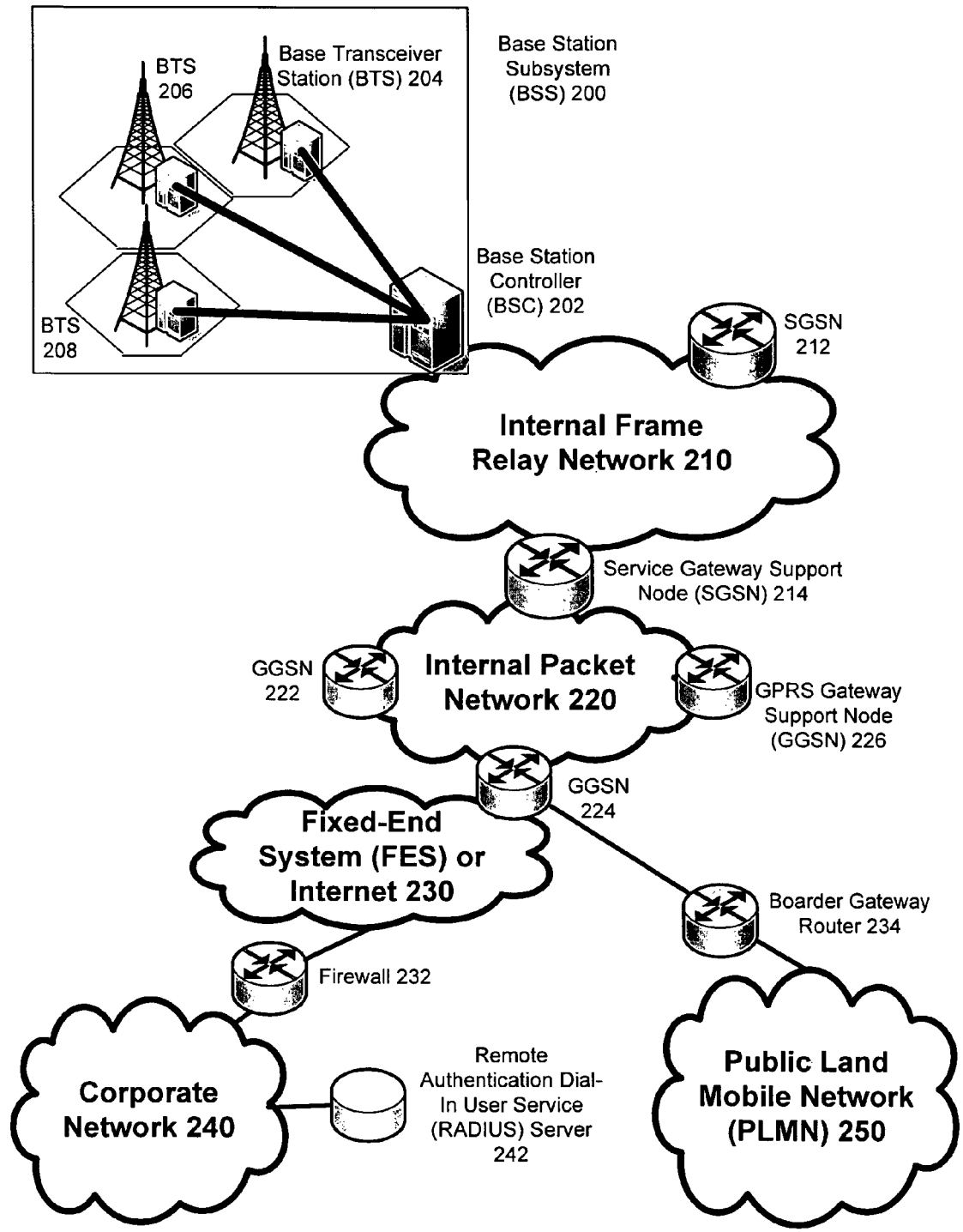
FIG. 7A illustrates an overview of a network environment suitable for service by embodiments of the invention.

FIG. 7A depicts an overall block diagram of an exemplary packet-based mobile cellular network environment, such as a GPRS network, in which the invention may be practiced. In such an environment, there are a plurality of Base Station Subsystems ("BSS") 200 (only one is shown), each of which comprises a Base Station Controller ("BSC") 202 serving a plurality of Base Transceiver Stations ("BTS") such as BTSs 204, 206, and 208. BTSs 204, 206, 208, etc. are the access points where users of packet-based mobile devices become connected to the wireless network. In exemplary fashion, the packet traffic originating from user devices is transported over the air interface to a BTS 208, and from the BTS 208 to the BSC 202. Base station subsystems, such as BSS 200, are a part of internal frame relay network 210 that may include Service GPRS Support Nodes ("SGSN") such as SGSN 212 and 214. Each SGSN is in turn connected to an internal packet network 220 through which a SGSN 212, 214, etc. can route data packets to and from a plurality of gateway GPRS support nodes (GGSN) 222, 224, 226, etc. As illustrated, SGSN 214 and GGSNs 222, 224, and 226 are part of internal packet network 220. Gateway GPRS serving nodes 222, 224 and 226 mainly provide an interface to external Internet Protocol ("IP") networks such as Public Land Mobile Network ("PLMN") 250, corporate intranets 240, or Fixed-End System ("FES") or the public Internet 230. As illustrated, subscriber corporate network 240 may be connected to GGSN 224 via firewall 232; and PLMN 250 is connected to GGSN 224 via boarder gateway router 234. The Remote Authentication Dial-In User Service ("RADIUS") server 242 may be used for caller authentication when a user of a mobile cellular device calls corporate network 240.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Figure 7B:
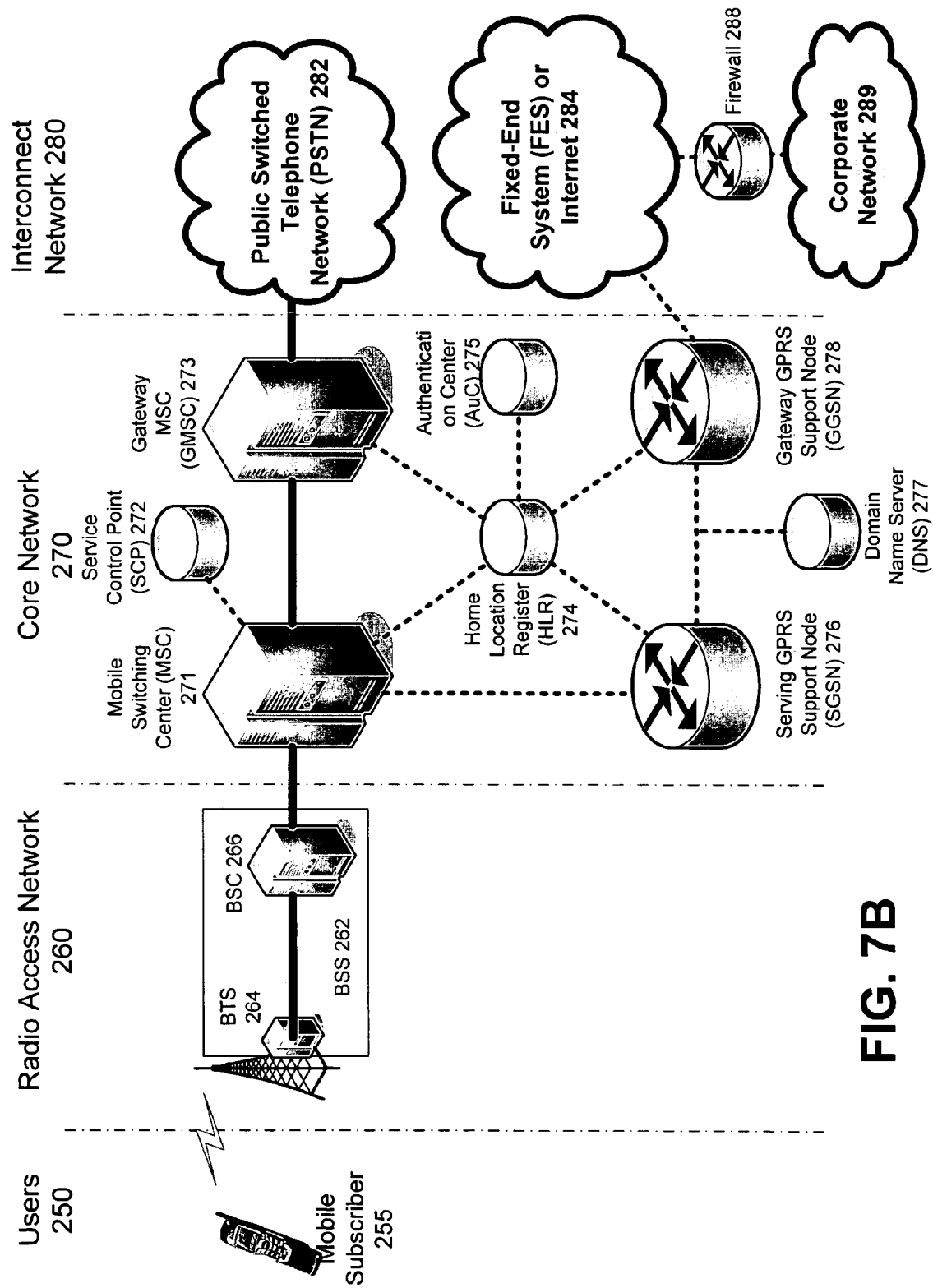
FIG. 7B illustrates a GPRS network architecture that may incorporate various aspects of the invention.

FIG. 7B illustrates the architecture of a typical GPRS network as segmented into four groups: users 250, radio access network 260, core network 270, and interconnect network 280. Users 250 comprise a plurality of end users (though only mobile subscriber 255 is shown in FIG. 7B). Radio access network 260 comprises a plurality of base station subsystems such as BSSs 262, which include BTSs 264 and BSCs 266. Core network 270 comprises a host of various network elements. As illustrated here, core network 270 may comprise Mobile Switching Center ("MSC") 271, Service Control Point ("SCP") 272, gateway MSC 273, SGSN 276, Home Location Register ("HLR") 274, Authentication Center ("AuC") 275, Domain Name Server ("DNS") 277, and GGSN 278. Interconnect network 280 also comprises a host of various networks and other network elements. As illustrated in FIG. 7B, interconnect network 280 comprises Public Switched Telephone Network ("PSTN") 282, Fixed-End System ("FES") or Internet 284, firewall 288, and Corporate Network 289.

A mobile switching center can be connected to a large number of base station controllers. At MSC 271, for instance, depending on the type of traffic, the traffic may be separated in that voice may be sent to Public Switched Telephone Network ("PSTN") 282 through Gateway MSC ("GMSC") 273, and/or data may be sent to SGSN 276, which then sends the data traffic to GGSN 278 for further forwarding.

When MSC 271 receives call traffic, for example, from BSC 266, it sends a query to a database hosted by SCP 272. The SCP 272 processes the request and issues a response to MSC 271 so that it may continue call processing as appropriate.

The HLR 274 is a centralized database for users to register to the GPRS network. HLR 274 stores static information about the subscribers such as the International Mobile Subscriber Identity ("IMSI"), subscribed services, and a key for authenticating the subscriber. HLR 274 also stores dynamic subscriber information such as the current location of the mobile subscriber. Associated with HLR 274 is AuC 275. AuC 275 is a database that contains the algorithms for authenticating subscribers and includes the associated keys for encryption to safeguard the user input for authentication.

In the following, depending on context, the term "mobile subscriber" sometimes refers either to the end user and sometimes to the actual portable device used by an end user of the mobile cellular service. When a mobile subscriber turns on his or her mobile device, the mobile device goes through an attach process by which the mobile device attaches to an SGSN of the GPRS network. In FIG. 7B, when mobile subscriber 255 initiates the attach process by turning on the network capabilities of the mobile device, an attach request is sent by mobile subscriber 255 to SGSN 276. The SGSN 276 queries another SGSN, to which mobile subscriber 255 was attached before, for the identity of mobile subscriber 255. Upon receiving the identity of mobile subscriber 255 from the other SGSN, SGSN 276 requests more information from mobile subscriber 255. This information is used to authenticate mobile subscriber 255 to SGSN 276 by HLR 274. Once verified, SGSN 276 sends a location update to HLR 274 indicating the change of location to a new SGSN, in this case SGSN 276. HLR 274 notifies the old SGSN, to which mobile subscriber 255 was attached before, to cancel the location process for mobile subscriber 255. HLR 274 then notifies SGSN 276 that the location update has been performed. At this time, SGSN 276 sends an Attach Accept message to mobile subscriber 255, which in turn sends an Attach Complete message to SGSN 276.

After attaching itself with the network, mobile subscriber 255 then goes through the authentication process. In the authentication process, SGSN 276 sends the authentication information to HLR 274, which sends information back to SGSN 276 based on the user profile that was part of the user's initial setup. The SGSN 276 then sends a request for authentication and ciphering to mobile subscriber 255. The mobile subscriber 255 uses an algorithm to send the user identification (ID) and password to SGSN 276. The SGSN 276 uses the same algorithm and compares the result. If a match occurs, SGSN 276 authenticates mobile subscriber 255.

Next, the mobile subscriber 255 establishes a user session with the destination network, corporate network 289, by going through a Packet Data Protocol ("PDP") activation process. Briefly, in the process, mobile subscriber 255 requests access to the Access Point Name ("APN"), for example, UPS.com (e.g., which can be corporate network 279) and SGSN 276 receives the activation request from mobile subscriber 255. SGSN 276 then initiates a Domain Name Service ("DNS") query to learn which GGSN node has access to the UPS.com APN. The DNS query is sent to the DNS server within the core network 270, such as DNS 277, which is provisioned to map to one or more GGSN nodes in the core network 270. Based on the APN, the mapped GGSN 278 can access the requested corporate network 279. The SGSN 276 then sends to GGSN 278 a Create Packet Data Protocol ("PDP") Context Request message that contains necessary information. The GGSN 278 sends a Create PDP Context Response message to SGSN 276, which then sends an Activate PDP Context Accept message to mobile subscriber 255.

Once activated, data packets of the call made by mobile subscriber 255 can then go through radio access network 260, core network 270, and interconnect network 280, in particular fixed-end system or Internet 284 and firewall 288, to reach corporate network 289.

Thus, network elements that may implicate the functionality of the service delivery based on real-time performance requirement(s) in accordance with the invention may include but are not limited to Gateway GPRS Support Node tables, Fixed End System router tables, firewall systems, VPN tunnels, and any number of other network elements as required by the particular digital network.

Figure 7C:
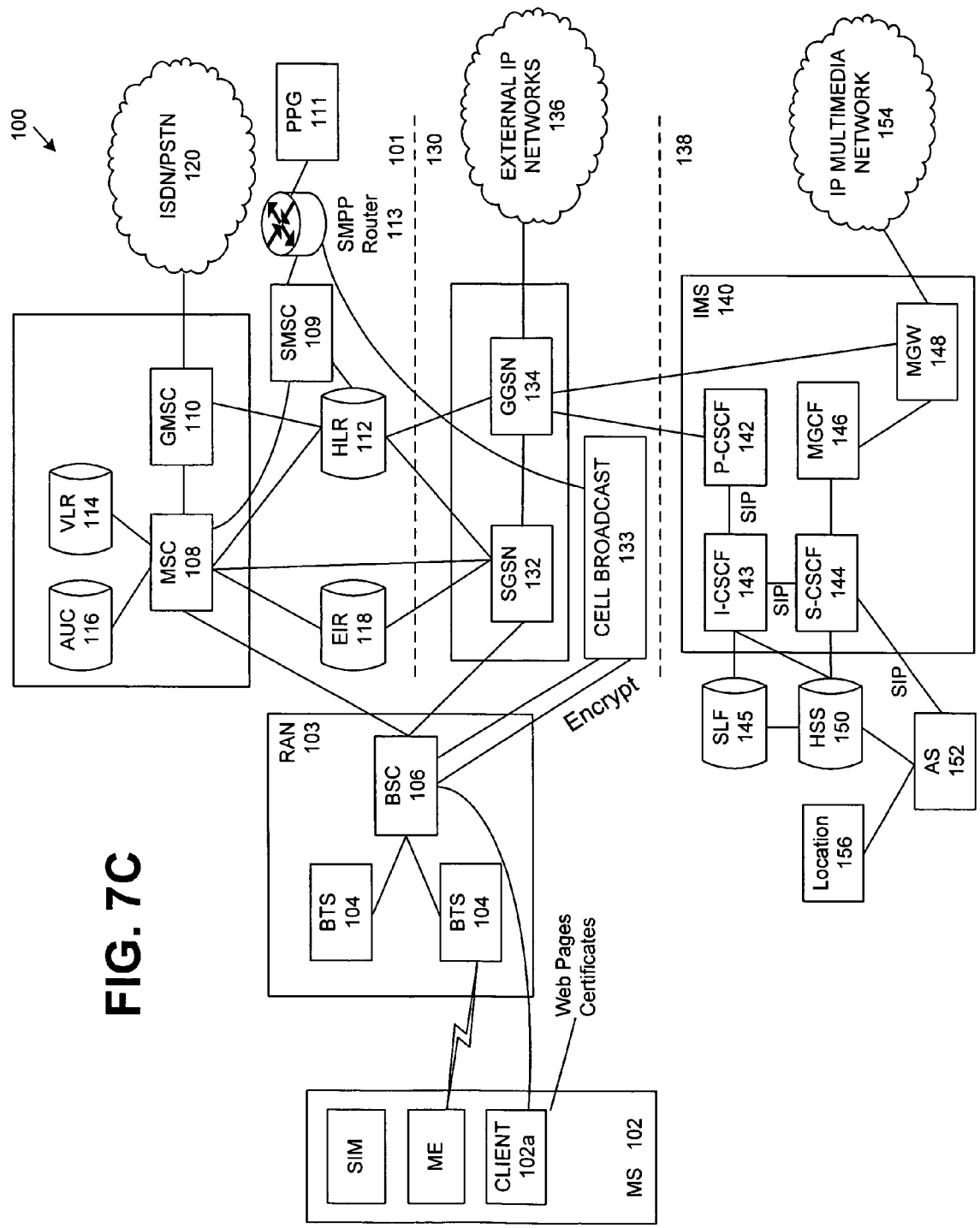
FIG. 7C illustrates an alternate block diagram of an exemplary GSM/GPRS/IP multimedia network architecture in which the invention may be employed.

FIG. 7C shows another exemplary block diagram view of a GSM/GPRS/IP multimedia network architecture 100 in which the apparatus and methods for service delivery based on real-time performance requirement(s) of the present invention may be incorporated. As illustrated, architecture 100 of FIG. 7C includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

A Short Message Service Center (SMSC) 109 allows one-to-one Short Message Service (SMS) messages to be sent to/from the MS 102. A Push Proxy Gateway (PPG) 111 is used to "push" (i.e., send without a synchronous request) content to the MS 102. The PPG 111 acts as a proxy between wired and wireless networks to facilitate pushing of data to the MS 102. A Short Message Peer to Peer (SMPP) protocol router 113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132, a cell broadcast and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls.

A Cell Broadcast Center (CBC) 133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While the present invention has been described in connection with the preferred embodiments of the various Figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

What is claimed:

1. A method for configuring a request for service from a first network to a second network, comprising:

receiving and preprocessing the request for service that is transmitted from the first network to the second network, wherein the first network and the second network are operated by disparate service providers;

classifying the request for service as a real-time or a non real-time service request based in part on a real-time performance requirement associated with handling the request for service, the real-time performance requirement determined by the first network based in part on a configuration provided by a service provider of the first network;

determining a subcategory of the classified request for service based in part on at least one network policy of the first network that depends on at least one of a geographical location or geographical area associated with the service, wherein the determining includes determining disparate subcategories for the classified request for service in disparate geographic locations or geographic areas; and forwarding the request for service to the second network along with at least one of the classification or the subcategory, the second network utilizes the at least one of the category or the subcategory to facilitate allocation of a resource of the second network to process the request for service.

2. The method of claim 1, further including allocating resources from the second network to process the request for service based on said subcategory of real-time performance requirement determined by the first network.

3. The method of claim 2, wherein the allocating resources includes allocating greater resources for requests for services classified as having high real-time performance requirements and allocating fewer resources for requests for services classified as having no or few real-time performance requirements.

4. The method of claim 1, wherein the forwarding includes storing the request for service in a buffer associated with the subcategory prior to handling the request for service by the second network.

5. The method of claim 1, wherein the receiving and pre-processing request for service includes receiving and preprocessing a stream of Internet Protocol (IP) packets, and the method is applied to classify each packet of the stream of IP packets.

6. The method of claim 1, wherein the determining includes identifying at least one subcategory of real-time performance requirement associated with the request for service including a very high real-time performance requirement category, a high real-time performance requirement category, a medium real-time performance requirement category or a low real-time performance requirement category.

7. The method of claim 1, wherein determining includes identifying at least one subcategory of non real-time performance requirement including a subcategory for services having interactive performance requirements.

8. The method of claim 1, wherein the classifying includes classifying the request for service to determine at least one category of real-time performance requirement including a category for services having a Quality of Service (QoS) requirement.

9. The method of claim 1, wherein the classifying includes classifying the request for service to determine at least one category of real-time performance requirement including a category for a service having a particular service ID or a selected subset of service IDs supported by the second network.

10. The method of claim 1, further comprising, post-processing the request for service including the at least one subcategory of real-time performance requirement along with other requests for services and associated categories in order to schedule processing of the request for service and the other requests for services according to one or more algorithms based on real-time performance requirements.

11. The method of claim 1, wherein the receiving and preprocessing includes receiving and preprocessing the request for service that is transmitted from the first network that is operated by at least one of a wireless wide area network (WAN) operator, a wireline network operator or an Internet service provider, and receiving and preprocessing the request for service that is transmitted to the second network that is operated by at least one of a wireless wide area network (WAN) operator, a wireline network operator or an Internet service provider.

12. A non-transitory computer readable storage medium storing computer executable instructions for configuring a request for service from a first network to a second network, said instructions comprising:
  instructions for receiving and preprocessing the request for service that is transmitted from the first network to the second network, the first and second networks are operated by disparate network service providers;
  instructions for determining a category of real-time performance requirement associated with handling the request for service according to a configuration provided by a network service provider of the first network and a network service provider specified policy based on at least one of a geographical location or geographical area associated with the service, wherein the instructions for determining include instructions for identifying different categories of real-time performance requirement for the service in different geographic locations or geographic areas; and
  instructions for forwarding the request for service to the second network along with the category of real-time performance requirement for facilitating resource allocation of the second network based on the category.

13. The non-transitory computer readable storage medium of claim 12, further comprising instructions for determining a number of resources from the second network to be allocated for processing the request for service based on said category of real-time performance requirement determined by the first network.

14. The non-transitory computer readable storage medium of claim 13, wherein the instructions for determining a number of resources include instructions for allocating greater resources for the request for service classified as having high real-time performance requirements as compared to the request for service classified as having no or few real-time performance requirements.

15. The non-transitory computer readable storage medium of claim 12, wherein the instructions for forwarding include instructions for storing the request for service in a buffer associated with the category of real-time performance requirement prior to handling the request for service by the second network.

16. The non-transitory computer readable storage medium of claim 12, wherein the instructions for receiving and pre-processing the request for service include instructions for receiving and preprocessing a stream of Internet Protocol (IP) packets, and further comprising instructions for classifying each packet of the stream of IP packets.

17. The non-transitory computer readable storage medium of claim 12, wherein the instructions for determining include instructions for determining at least one category of real-time performance requirement including a very high real-time performance requirement category, a high real-time performance requirement category, a medium real-time performance requirement category or a low real-time performance requirement category.

18. The non-transitory computer readable storage medium of claim 12, wherein the instructions for determining include instructions for determining at least one category of real-time performance requirement including a category for services having interactive performance requirements.

19. The non-transitory computer readable storage medium of claim 12, wherein the instructions for determining include instructions for determining at least one category of real-time performance requirement including a category for services having a Quality of Service (QoS) requirement.

20. The non-transitory computer readable storage medium of claim 12, wherein the instructions for determining include instructions for determining at least one category of real-time performance requirement including a category for a service having a particular service ID or a selected subset of service IDs supported by the second network.

21. The non-transitory computer readable storage medium of claim 12, further comprising, instructions for post-processing the request for service including the at least one category of real-time performance requirement along with other requests for services and associated categories in order to schedule processing of the request for service and the other requests for services according to one or more algorithms based on real-time performance requirements.

22. The non-transitory computer readable storage medium of claim 21, wherein the post-processing instructions schedule processing of the request for service and the other requests for services according to the one or more algorithms that schedule services with high real-time performance requirements before services with low real-time performance requirements.

23. A network component for configuring a request for service from a first network to a second network, said network component comprising:
    means for receiving and preprocessing the request for service that is transmitted from the first network to the second network operated by disparate network service providers;
    means for classifying the request for service to determine at least one category of real-time performance requirement associated with handling the request for service according to a configuration provided by a network service provider of the first network and based in part on at least one of a geographical location or geographical area associated with the service, wherein the means for classifying identifies different categories of real-time performance for the service in different geographic locations or geographic areas; and
    means for forwarding the request for service to the second network along with the at least one category of real-time performance requirement for facilitating resource allocation in the second network based on the at least one category.

24. The network component of claim 23, further comprising means for allocating resources from the second network to process the request for service based on said at least one category of real-time performance requirement.

25. The network component of claim 24, wherein the means for allocating resources allocates a greater number of resources for the request for service if classified as having high real-time performance requirements and allocates a fewer number of resources for the request for service if classified as having no or few real-time performance requirements.

26. The network component of claim 23, wherein the means for forwarding includes means for storing the request for service associated with the at least one category of real-time performance requirement prior to handling of the request for service by the second network.

27. The network component of claim 23, wherein the means for receiving and preprocessing at least one of receives or preprocesses a stream of Internet Protocol (IP) packets, and the means for classifying categorizes each packet of the stream of IP packets.

28. The network component of claim 23, wherein the means for classifying determines the at least one category of real-time performance requirement including a very high real-time performance requirement category, a high real-time performance requirement category, a medium real-time performance requirement category or a low real-time performance requirement category.

29. The network component of claim 23, wherein the means for classifying determines the at least one category of real-time performance requirement including a category for services having interactive performance requirements.

30. The network component of claim 23, wherein the means for classifying determines the at least one category of real-time performance requirement including a category for services having a Quality of Service (QoS) requirement.

31. The network component of claim 23, wherein the means for classifying determines the at least one category of real-time performance requirement including a category for a service having a particular service ID or a selected subset of service IDs supported by the second network.

32. The network component of claim 23, further comprising, means for post-processing the request for service including the at least one category of real-time performance requirement along with other requests for services and associated categories in order to schedule processing of the request for service and the other requests for services according to an algorithm based on real-time performance requirements.

33. The network component of claim 32, wherein the means for post-processing schedules processing of the request for service and the other requests for services according to the algorithm that schedule services with high real-time performance requirements before services with low real-time performance requirements.

* * * * *